March 17, 1964  J. T. BURDETT  3,125,293
THERMOSTATIC GAS VALVE
Filed July 10, 1957  2 Sheets-Sheet 1
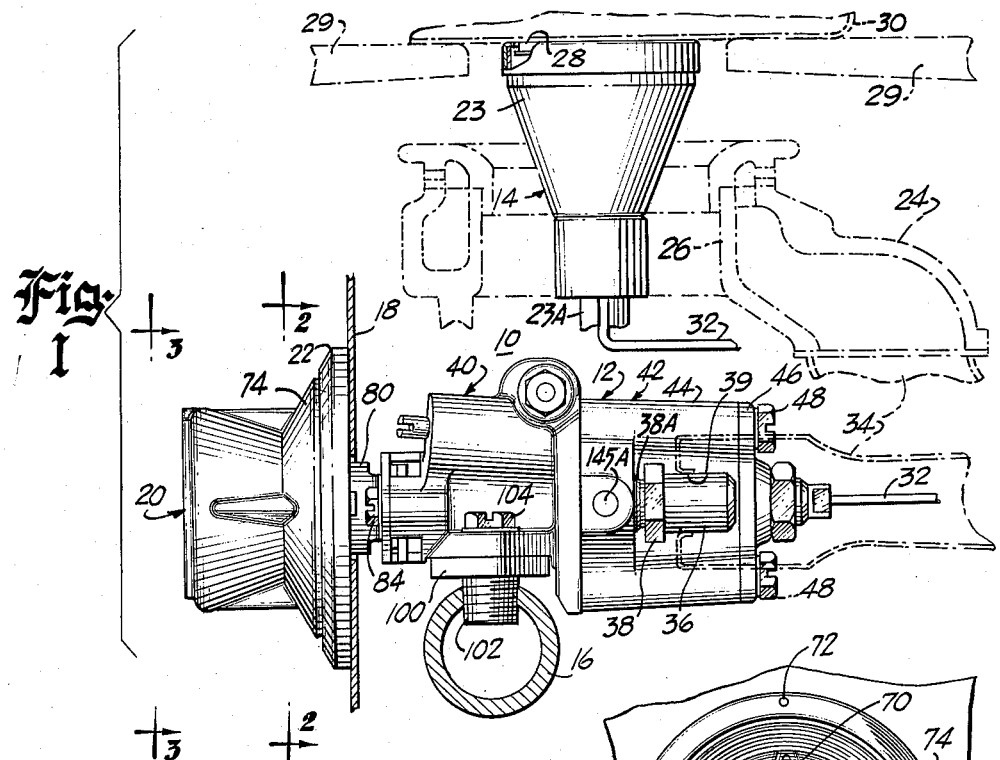
INVENTOR.
JOHN T. BURDETT
BY
Mason, Kolehmainen, Rathburn and Wyss.
ATTORNEYS.

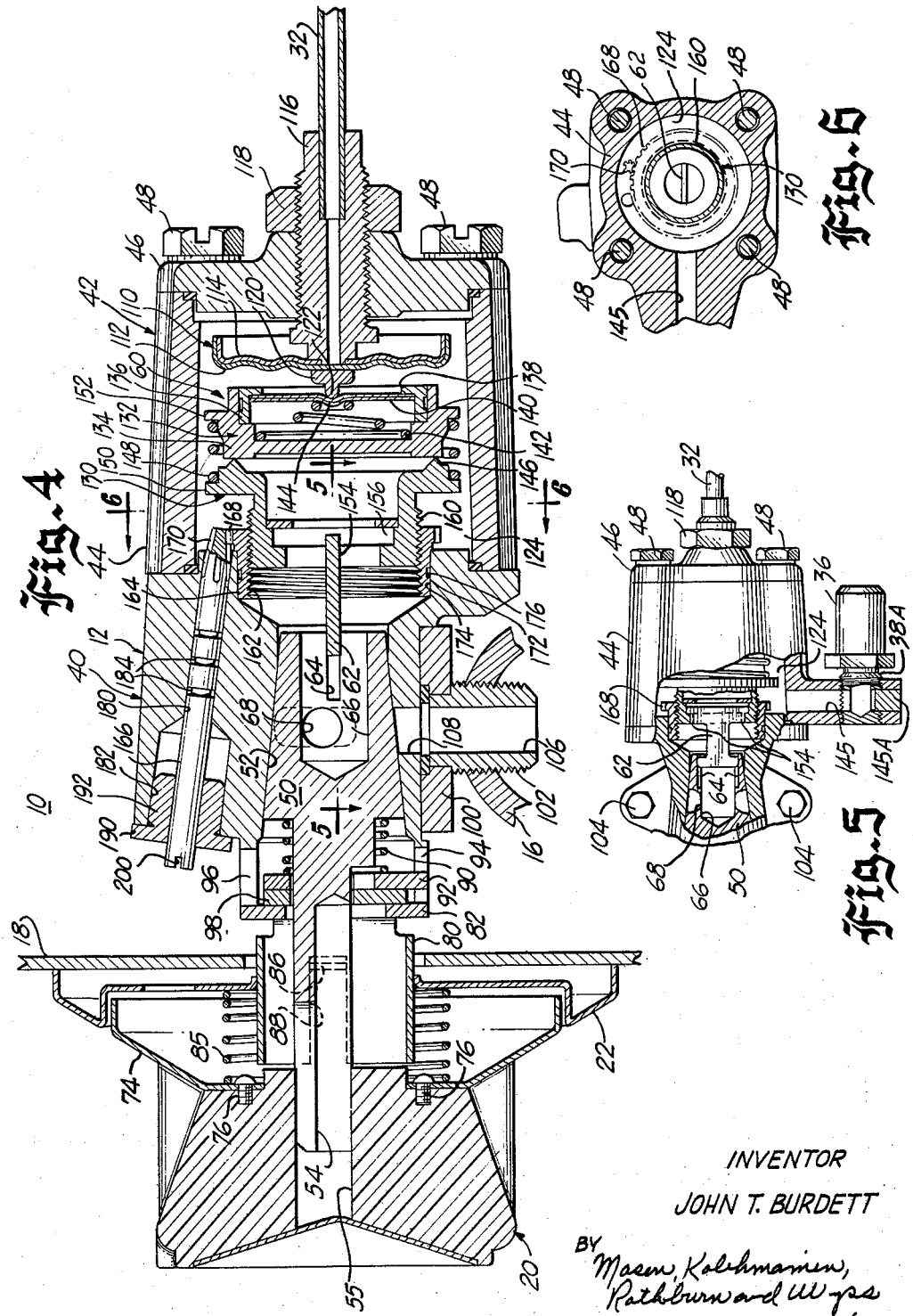

United States Patent Office

3,125,293
Patented Mar. 17, 1964

3,125,293
THERMOSTATIC GAS VALVE
John T. Burdett, Princeton, Ill., assignor to Harper-Wyman Company, Chicago, Ill., a corporation of Illinois
Filed July 10, 1957, Ser. No. 670,975
22 Claims. (Cl. 236—99)

The present invention relates to gas valves and has for its primary object the provision of a new and improved thermostatic valve for regulating the flow of gas to a burner, which valve is of the type manually operable between an on and off position and in the on position of which the flow of gas is thermostatically controlled.

The present invention is directed to a valve of the foregoing type having new and improved means for adjusting the valve for calibration purposes so that the burner can be controlled to maintain a temperature indicated by temperature indicating means associated with the valve.

A more specific object of the present invention is to provide a thermostatic gas valve comprising thermostatically actuated gas flow regulating means in the form of a valve having a movable valve element and a valve seat, the latter of which is manually movable to adjusted positions in order that different selected temperatures can be maintained and which valve seat is also manually adjustable through calibrating means for calibration purposes.

In brief, the gas valve of the present invention is of a type including a manually rotatable valve element which is movable from an off to an on position. The extent of movement toward the on position is utilized to determine the temperature to be maintained by the valve. The valve includes a thermostatically actuated movable element located at the outlet from the rotatable valve. This movable valve element is moved to different positions in response to the temperature of a device such as a cooking utensil. The temperature of the cooking utensil is measured by a device called a sensing element or unit including a vessel engaging capsule containing a thermostatic fluid and connected through a capillary tube to a bellows or diaphragm assembly located in the valve and operatively connected to the controlled element regulating the flow of gas. Associated with the thermostatically controlled movable valve element is a valve seat operatively connected to the manually rotatable valve element. This valve seat is moved to different positions by rotation of the valve handle for the purpose of determining the temperature to be maintained. The handle and the valve supporting structure are provided with temeprature indicia in order that the desired temperature to be maintained can be easily selected. In manufacture, it becomes necessary to correlate the temperature indicia on the handle with the temperature actually maintained by the thermostatic valve. In order to accomplish this correlation in a simple and economical manner, the valve of the present invention is provided with calibration means accessible at the exterior of the valve. This calibration means is adapted manually to be moved in order to move the valve seat independently of the main temperature control. As illustrated herein, the movement of the valve seat is effected by a rotatable shaft extending to the exterior of the valve and connected as by suitable gearing to a rotatable calibrating ring having a threaded connection with the movable valve seat whereby rotation of the ring results in axial movement of the valve seat.

Other objects and advantages of the present invention will become apparent from the ensuing description of an illustrative embodiment thereof in the course of which reference is had to the accompanying drawings, in which:

FIG. 1 is an exploded and partially phantom and diagrammatic view illustrating a valve of the present invention in side elevation and actual size in combination with a burner;

FIG. 2 is an end veiw substantially along the line 2—2 of FIG. 1 illustrating details of construction of the valve with the valve handle and a range body panel omitted;

FIG. 3 is an end view along the line 3—3 of FIG. 1 and illustrating in enlarged manner details of the valve operating knob and temperature indicating means;

FIG. 4 is an enlarged axial cross sectional view of the valve, the view being taken substantially along the broken line 4—4 of FIG. 2; and FIGS. 5 and 6 are fragmentary sectional views along lines 5—5 and 6—6 of FIG. 4.

Referring now to the drawings and first to FIG. 1, the gas valve of the present invention is illustrated as a whole by reference character 10. It comprises primarily a manually operable gas valve 12 having associated with it a thermostatic sensing element or unit indicated as a whole by reference character 14 which may be of known construction but which is illustrated as being of the type disclosed and claimed in the copending application of Raymond F. Wiberg and Frank J. Silhavy, Serial No. 671,047, now Patent No. 2,892,349 filed contemporaneously herewith and assigned to the same assignee of this application. The gas valve also includes features disclosed and claimed in the copending application of Charles C. Lamar, Raymond F. Wiberg and Frank J. Silhavy, Serial No. 671,048, now abandoned, also filed contemporaneously herewith and assigned to the assignee of this application.

The gas valve 10 is mounted upon a gas inlet manifold 16 of conventional construction and forming part of a gas range which has not been illustrated except for a body panel 18 shown but fragmentarily. This panel is located in front of the valve 12 and in front of the panel is located a rotatable valve handle 20 and an associated stationary bezel 22. The sensing unit 14, which includes a shield 23, depressibly mounted on a supporting tube 23A, is disposed substantially centrally of a gas burner 24 having a central opening 26 in which the sensing unit is disposed so that a capsule 28, depressibly mounted relative to the shield, and the upper portion of the shield 23 normally project above the top of the burner and an associated grate 29 (only the bars of which are shown). When a cooking vessel 30, shown fragmentarily, is placed on the grate, the shield and capsule of the sensing unit are depressed but maintained in good contact with the bottom of the vessel. The thermostatic capsule 28 is connected to the valve through a capillary tube 32.

Gas is supplied from the valve to the burner through a mixing or venturi tube of conventional construction and indicated by the reference character 34. Actually, the valve is coupled to the mixing tube through a gas outlet hood 36 projecting into the inlet 39 of the venturi. The hood has a hexagonal or nut portion 38 by means of which the hood can readily be secured to a nipple 38A mounted on the valve.

The valve includes two main body parts, these being a body forging or casting 40 and a two-part housing 42, which may be casting or stamping, and comprising a tubular intermediate portion 44 and an end cap 46 which are detachably secured together and to the body by a plurality of screw bolts 48.

Referring now more particularly to FIG. 4, the valve 12 includes a rotatable valve element taking the form of a tapered plug 50 mounted in a tapered plug receiving chamber 52 formed in the body forging. The plug is rotated by the valve handle 20 which is mounted at the outer end of a valve stem 54 of substantially D-shape, the stem fitting into opening 55 in the handle.

The valve plug is so constructed and arranged as to be movable from an off position in which no gas flows to an on position of considerable angular range in which a full quantity of gas flows to it and which on position also determines the temperature to be maintained by the valve, the plug being operatively connected to a thermostatically actuated gas flow regulating valve indicated as a whole by reference character 60 and which is coaxially disposed relative to the valve plug. The operative connection between the plug and valve 60 is effected through a coupling tongue or key 62 of generally I-shape as shown in FIG. 5 and slidably related to the valve plug by means of a slot 64, although actually there are two slot portions at diametrically opposite points of the plug at opposite sides of the axial passageway 66 formed in one end of the plug, as best shown in FIG. 5. The valve plug is also provided with a radial passageway 68 of sufficient arcuate extent as to provide flow of gas through the valve plug in the various operative on positions of the plug. The radial passageway 68 may be of slot-like construction or a plurality of coplanar circular passageways or ports may be provided as desired.

The valve handle 20, referring now to FIG. 3, is provided with an off position indicia which may be such as that illustrated by the reference character 70 and which is cooperatively associated with stationary indicia 72 on the bezel 22. Mounted upon the handle 20 is a dial plate 74 carrying on it various temperature indicia which may be between 150° and 400° F. as shown in FIG. 3. These indicia are arranged so that the valve is turned counterclockwise and viewed from the front in order to go from off to the various temperature settings. The dial 74 is secured to the handle as by the screws 76 shown in FIG. 4.

The bezel 22 is slidably mounted at the exterior of a bezel mounting tube 80 secured forwardly of an end cap 82 by the end cap securing screws 84. The bezel is resiliently held against the outside of the stove panel 18 as by a relatively light spring 85 surrounding the bezel mounting tube and abutting at one end against the bezel and at the other end against the inside of dial 74. Provision is made for mounting the bezel in only one position as providing the bezel with a pair of generally diametrically opposite tongues 86, only one of which is shown in FIG. 4, and which may be of different widths so as to be received only in a particular position in the diametrically opposed slots 88 provided in the bezel mounting tube, as shown best in FIG. 2.

The rotatable valve plug is held seated in its chamber 52 by a spring 90 surrounding the inner portion of the valve stem 54. One end of the spring abuts against the large end of the valve plug and the other against the detent washer 92 which cooperates with spaced apart shoulders 94 and 96 in the body forging to determine the off and high positions of the valve plug. Between the washer 92 and the end cap 82 is a spacer washer 98.

The valve 12 is mounted upon the manifold 16 by a mounting device comprising a flat generally diamond shaped mounting plate 100 to which is brazed an externally threaded nipple 102 adapted to be screwed into the manifold. The plate 100 is secured to the underside of the valve body as by the screws 104, see FIG. 2.

The manifold is connected to the valve plug by an inlet passageway 106 in the nipple and by a radial passageway 108 in the valve body, these two passageways being aligned as shown in FIG. 4.

As heretofore noted, the connection of the valve 12 to the sensing element 14 is effected through the capillary tube 32. This tube terminates at a thermostatic actuating element 110 taking the form of an expansible diaphragm comprising the separable elements 112 and 114. The tube 32 is coupled to the diaphragm by a coupling element 116 threaded into the removable cover plate and locked in adjusted position by a lock nut 118. The diaphragm actuates a thrust element 120 secured to the diaphragm element 112 and having a generally conical shape terminating in a rounded point 122.

The diaphragm assembly 110 and the thermostatically actuated valve 60 are mounted within a chamber 124 formed in the main by the housing 42. The valve 60 includes an annular valve seat defining element 130 and an axially movable valve element 132, the latter of which is actuated by the diaphragm assembly. The movable valve element 132 includes a generally cup-like structure 134 to the open end of which is secured as by swaging a ring 136 having an inwardly extending flange 138. A bimetallic ambient temperature compensation providing disc 140 abuts against the flange 138 toward which it is biased by a spring 142. The disc 140 is provided with a central indentation 144 for the reception of the pointed end 122 of the diaphragm actuator.

The outlet hood 36 communicates with chamber 124 through the nipple 38A and a radial passageway 145 in the housing 42, the outer end of which is closed by plug 145A.

The valve seat defining element 130 is generally tubular in form and has a relatively annular shaft valve seat 146. The movable element 132 is biased toward open position from the valve seat by a spring 148, the opposite ends of which abut against external annular flanges 150 and 152 on the stationary and movable valve elements, respectively.

The position of the stationary valve seat is manually changed or adjusted in order to select the temperature to be maintained by the valve. As heretofore indicated, this is accomplished by rotation of the valve plug and the plate or key 62 which is slidably connected to the valve plug and which is also relatively fixedly connected to the stationary valve element, the latter being provided with an axial slot structure 154 and an internal groove 156 to receive an end of the I-shaped key. When the valve plug is rotated, the valve seat is also rotated and such rotation results in longitudinal axial movement to the valve seat. This axial movement is effected by providing the valve seat element 130 with the external threads 160 which are received in the internal threads 162 in a calibrating device or ring 164 which, in accordance with the present invention, is adapted also to be rotated from the exterior of the valve for calibration purposes through a calibrating shaft 166.

It is this calibrating ring and the externally accessible calibration shaft 166 which form the important feature of the present invention. Referring particularly to FIG. 4 it will be noted that the calibrating ring has an annular gear 168 in mesh with a bevel spur gear 170 at the inner end of the shaft 166. Rotation of the shaft 166 results in rotation of the calibrating ring 164. The rotation of the latter effects longitudinal or axial movement of the valve seat, the latter being held against rotation because of the friction of the valve plug, etc. connected to it. The calibrating ring is held against axial movement by its supporting means, which includes a cylindrical smooth exterior portion 172 rotatably received in a bore 174 at the end of the body and the bevel gear. A grease retaining sealing groove 176 is provided intermediate its length.

The calibrating shaft 166 is mounted at the upper side of the body. It extends through a passageway having a smaller diameter portion 180 and a larger diameter portion 182. The shaft 166 is provided with grease retainer rings 184 in the portion thereof received in the smaller diameter part 180.

Attached to the outer end of the calibration shaft is an indicator element 190 having indicia thereon, see FIG. 2, and an elongated hub portion 192 received in the larger diameter portion 182 of the passageway. The shaft 166 is held in adjusted position by suitable means which may take the form of an indicating pointer 194 having a finger portion 196 bearing against the hub 190 and adapted to be forced against the hub by a securing screw 198 which has to be loosened in order to permit rotation of the shaft which is provided with a screwdriver slot 200 at its outer end so that it can be readily turned as by a screwdriver.

It is believed that the manufacture and assembly of the gas valve of the present invention will be apparent from the foregoing detailed description. In operation, the valve handle 20 is turned to an on position, the extent of movement determining the temperature to be maintained by the valve. As the valve is turned, gas flows from the manifold through the passageways 106 and 108 and 68 to the axial passageway 66 in the valve plug. When the valve is turned to open position, the movable valve seat 130 is moved away from the thermostatically actuated control valve element so that gas flows to the chamber 124 and thence to the hood through the radial passageway 145 communicating with the outlet hood 36. The gas flows to the burner and is ignited in known manner. The sensing unit 14 responds to the temperature of the cooking vessel 30 and results in variations in volume of the thermostatic fluid and actuation of the diaphragm assembly 110. The latter expands or contracts as the case may be to move the movable valve element 132 to control the flow of gas to the burner.

The calibrating means of the present invention is generally used to calibrate the valve at the factory and, if necessary, at the place of use. In calibration, the valve handle is set to some selected temperature and the operation is observed in connection with some vessel or device having a thermostat associated therewith for determining its temperature. The temperature of the cooking vessel is observed in relation to the valve handle and if the two are not in conformity, then the calibrating shaft 166 is rotated to turn the calibrating ring 164 in one direction or the other to move the movable valve seat axially in the proper direction so that the indicated temperature corresponds to the maintained temperature.

In order to effect the calibration, it is necessary to unloosen the screw 198 and after the calibration has been effected the screw is tightened thereby to force the pointer 196 against the hub element 190 which is fixedly secured to the shaft 166 against the valve body. The hub 190 may be provided with indications, as shown in FIG. 2, to indicate the extent of adjustment in relation to the amount of turning of the calibration shaft.

While the present invention has been illustrated and described in connection with the details of an embodiment thereof, it should be understood that these details are intended to be illustrative and not limitative of the invention.

Having thus described my invention, what I desire to secure by United States Letters Patent is a follows:

1. A thermostatic gas valve, including in combination, a valve body, a tapered plug receiving chamber therein, a rotatable tapered plug mounted in said chamber and having gas flow passages therein, means for rotating said plug from an off to an operative position corresponding to a temperature to be maintained by said valve, means including a thermostatically actuated valve in communication with said plug and comprising a seat portion and a thermostatically movable portion for regulating the flow of gas through said plug, said seat being movable relative to said movable valve portion for determining the temperature to be maintained, means coupling said seat portion to said valve plug to effect movement of said seat, and other means including adjusting means mounted on the valve body outside of the plug receiving chamber for effecting movement of said seat for calibration purposes.

2. A thermostatic gas valve, including in combination, a manually operable valve element rotatable to different on positions for determining the temperature to be maintained by the valve, a thermostatically actuated valve including a rotatably mounted valve seat coupled to said manually operable valve element and rotatable in accordance with the rotation of the valve element, means including external threads on said seat and a seat support having internal threads for effecting axial movement of said valve seat in response to rotation thereof, said seat support also being rotatably mounted, and other means operable independently of the manually operable valve element for rotating said seat support, whereby rotation of the latter while the seat is held against rotation results in axial movement of said seat.

3. A thermostatic gas valve, including in combination, a manually operable valve element rotatable to different on positions for determining the temperature to be maintained by the valve, a thermostatically actuated valve including a rotatably mounted valve seat coupled to said manually operable valve element and rotatable in accordance with the rotation of the valve element, means including external threads on said seat and a seat support having internal threads for effecting axial movement of said valve seat in response to rotation thereof, said seat support also being rotatably mounted, and other means operable independently of the manually operable valve element for rotating said seat support, whereby rotation of the latter while the seat is held against rotation results in axial movement of said seat, said last mentioned means including a ring gear on said seat support and a rotatable shaft geared to said ring gear and accessible from the exterior of the gas valve.

4. A thermostatic gas valve, including in combination, a manually operable valve element rotatable to different on positions for determining the temperature to be maintained by the valve, a thermostatically actuated valve including a rotatably mounted valve seat coupled to said manually operable valve element and rotatable in accordance with the rotation of the valve element, means including external threads on said seat and a seat support having internal threads for effecting axial movement of said valve seat in response to rotation thereof, said seat support also being rotatably mounted, other means operable independently of the manually operable valve element for rotating said seat support, whereby rotation of the latter while the seat is held against rotation results in axial movement of said seat, said last mentioned means including external gearing on said seat support and a rotatable shaft journalled in said body geared to said gearing, and means for locking said shaft against rotation.

5. A thermostatic gas valve, including in combination, a valve element rotatable to different on positions for determining the temperature to be maintained by the valve, means including a valve stem operably connected to said element and projecting from one side of the body for rotating said element, a thermostatically actuated valve including a rotatably mounted valve seat coupled to said manually operable valve element and rotatable in accordance with the rotation of the valve element, means including external threads on said seat and a seat support having internal threads for effecting axial movement of said valve seat in response to rotation thereof, said seat support also being rotatably mounted, and other means operable independently of the manually operable valve element for rotating said seat support, whereby rotation of the latter while the seat is held against rotation results in axial movement of said seat, said other means including a ring gear on said seat support and a rotatable shaft mounted in said body and geared to said ring gear and projecting from the same side of the body as the valve stem.

6. A thermostatic gas valve, including in combination, a valve body, a tapered plug receiving chamber therein, a rotatable tapered plug mounted in said chamber and having gas flow passages therein, means including a stem projecting from one side of the body for rotating said plug from an off to an operative position corresponding to a temperature to be maintained by said valve, means including a thermostatically actuated valve in communication with said plug and comprising a seat portion and a thermostatically movable portion for regulating the flow of gas through said plug, said seat being movable relative to said movable valve portion for determining the temperature to be maintained, means coupling said seat portion to said valve plug to effect movement of said seat, and other means including adjusting means mounted on said valve body outside the valve chamber and projecting outside of the valve body from the same side of the valve body as the stem for effecting movement of said seat for calibration purposes.

7. In a thermostatic control device, the combination comprising a housing having an inlet and an outlet, movable valve seat means in said housing disposed between the inlet and outlet, a valve member cooperating with said valve seat means to regulate a flow of fluid to the outlet, thermally responsive means operatively connected to said valve member to reciprocate the same in response to temperature variations, actuating means operatively connected to said valve seat means for positioning the same relative to said valve member according to a preselected temperature setting, and means displaced from said actuating means to adjust said valve seat means independently of said actuating means.

8. In a thermostatic control device, the combination comprising a housing having an inlet and an outlet, movable valve seat means in said housing disposed between the inlet and outlet, a valve member cooperating with said valve seat means to regulate a flow of fluid to the outlet, thermally responsive means operatively connected to said valve member to reciprocate the same in response to temperature variations, actuating means operatively connected to said valve seat means for positioning the same relative to said valve member according to a preselected temperature setting, and means displaced from said actuating means to adjust said valve seat means independently of said actuating means, said adjusting means includes motion transmitting means operatively connected to said valve seat means.

9. In a thermostatic control device, the combination comprising a housing having an inlet and an outlet, a valve chamber in said housing disposed between the inlet and outlet, a movable valve seat assembly including a first member mounted for rotation in said chamber and a second member mounted for rotational and axial movement in the first member, a valve member cooperating with said valve seat assembly to regulate a flow of fluid to the outlet, thermally responsive means operatively connected to said valve member to reciprocate the same in response to temperature variations, actuating means operatively connected to said second member to rotate the same in said first member for positioning said second member relative to said valve member, and means operatively connected to said first member to rotate the same causing said second member to move axially thereto for adjustably positioning said second member relative to said valve member.

10. A thermostatic control device comprising a housing having an inlet and an outlet separated by a valve chamber, an annular flanged bushing rotatably mounted in the chamber and having gear teeth on is external flanged periphery and screw threads on its internal surface, a generally cup-shaped valve seat having a bottom wall and a cylindrical wall, external screw threads on said cylindrical wall engaging the screw threads on said bushing rotatably mounting said valve seat in said bushing, a reciprocating valve member cooperating with said valve seat for regulating a flow of fuel to said outlet in accordance with a selected temperature, resilient means mounted in compression between said valve seat and said reciprocating valve member for biasing them apart, thermally responsive means operatively connected to said reciprocating valve member to reciprocate the same relative to said valve seat in response to changes from the selected temperature, actuating means operatively associated with the bottom wall of said valve seat for moving the same in said bushing to displace said valve seat axially relative to said reciprocating valve member for setting the selected temperature, an adjusting screw carried by said housing, and a pinion on one end of said adjusting screw extending into said chamber and engaging the gear teeth on said bushing whereby rotation of said bushing by said screw causes axial movement of said valve seat to adjust the same axially relative to said reciprocating valve member.

11. The combination recited in claim 7 wherein the adjusting means includes motion transmitting means operatively connected to said valve seat means.

12. The combination as recited in claim 9 wherein said last mentioned means includes a calibration screw having an outer end extending exterior of said housing and an inner end extending into said valve chamber, and motion transmitting means are interconnected between said inner end and said first member of said valve seat assembly.

13. The combination as recited in claim 12 wherein said motion transmitting means comprises a pinion mounted on the inner end of said calibration screw, and a gear formed on said first member of said valve seat assembly.

14. A thermostatic control device comprising a housing having an inlet and an outlet separated by a valve chamber, a tapered valve seat in said housing adjacent the inlet, a hollow valve member having an inner end extending into the chamber, a tapered intermediate part coacting with said tapered valve seat and formed with a port adapted to register with the inlet, and an outer end extending exteriorly of said housing, means mounted on the outer end of said hollow valve member for rotating the same to move the port into and out of registry with the inlet, an annular flanged bushing rotatably mounted in the chamber and having gear teeth on its external flanged periphery and screw threads on its internal surface, a generally cup-shaped valve seat having oppositely disposed slots in its bottom wall and screw threads on its external surface engaging the screw threads on said bushing, a reciprocating valve member cooperating with said valve seat to maintain a selected temperature in a space to be heated, thermally responsive means operatively connected to said reciprocating valve member to reciprocate the same relative to said valve seat in response to changes from the selected temperature, resilient means mounted in compression between said reciprocating valve member and said valve seat, a drive member having a front end locked into the slots on the bottom wall of said valve seat and a rear end slidably mounted on the inner end of said hollow valve member whereby rotation of the same causes rotation of said valve seat to move the same axially relative to said reciprocating valve member for setting the selected temperature, and a calibration screw having a pinion on one end extending into said chamber and engaging the gear teeth on said bushing whereby rotation of said bushing by said screw causes axial movement of said valve seat to adjust the same axially relative to said reciprocating valve member.

15. A thermostatic control device comprising a housing having an inlet and an outlet separated by a valve chamber, an annular flanged bushing rotatably disposed in the chamber and having gear teeth on its external flanged periphery and screw threads on its internal surface, a generally cup-shaped valve seat having a bottom wall and a cylindrical wall, external screw threads on said cylindrical wall engaging the screw threads on said bushing, a reciprocating valve member cooperating with said valve seat for regulating a flow of fuel to said outlet in accordance with a selected temperature, resilient means engaging said valve seat and biasing said valve member away from said valve seat, thermally responsive means operatively connected to said reciprocating valve member to reciprocate the same relative to said valve seat in response to changes from the selected temperature, actuating means operatively associated with said cup-shaped valve seat to move the same axially relative to said reciprocating valve member for setting the selected temperature, and adjusting means extending into said chamber and engaging the gear teeth on said bushing and rotating the same whereby said valve seat is axially moved relative to said bushing.

16. A thermostatic gas valve, including in combination, a manually operable valve element rotatable to different on positions for determining the temperature to be maintained by the valve, a thermostatically actuated valve including a first rotatably mounted valve member coupled to said manually operable valve element and rotatable in accordance with the rotation of the valve element, a second member cooperating with the first member to form said thermostatically actuated valve, means for effecting relative axial movement of said members in response to manual rotation of the valve element, and other means operable independently of the manually operable valve element for effecting axial movement of one of said valve members, said other means including a ring gear and a rotatable shaft geared to said ring gear and accessible from the exterior of the gas valve.

17. A thermostatic gas valve, including in combination, a valve body, a manually operable valve element mounted on said valve body and rotatable to different on positions for determining the temperature to be maintained by the valve, means including a valve stem operatively connected to said element and projecting from one side of the body for rotating said element, a thermostatically actuated valve including a first rotatably mounted valve member coupled to said manually operable valve element and rotatable in accordance with the rotation of the valve element, a second member cooperating with the first member to form said thermostatically actuated valve, means for effecting relative axial movement of said members in response to manual rotation of said valve element, and other means operable independently of the manually operable valve element for effecting axial movement of one of said valve members, said other means including a ring gear and a rotatable shaft mounted in said body and geared to said ring gear and projecting from the same side of the body as the valve stem.

18. In a thermostatic control device, the combination comprising a housing having an inlet and an outlet, movable valve seat means including a bushing having peripheral gear teeth disposed in said housing between the inlet and the outlet, a movable valve member cooperating with said valve seat means to regulate a flow of fluid to the outlet, thermally responsive means operatively connected to said valve member to reciprocate the same in response to temperature variations, actuating means operatively connected to said valve seat means for moving the same axially relative to said valve member, a pinion disposed in said housing and meshing with the gear teeth, and means extending through said housing for carrying said pinion.

19. In a thermostatic control device, the combination comprising a housing having an inlet and an outlet, control valve means operably disposed in said housing adjacent the inlet for controlling a flow of fluid therefrom, dial means disposed on an external wall of said housing and operable for moving said control valve means between controlling positions, a regulating valve member operably disposed in said housing for regulating the flow of fluid to the outlet, thermally responsive means operative for imparting regulatory movement to said regulating valve member in response to temperature variations, valve seat means for said regulating valve member including a bushing having peripheral gear teeth, said valve seat means being operatively connected to said control valve means for simultaneous movement therewith by said dial means, a pinion meshing with the gear teeth on said bushing, and means extending through the same wall of said housing as said dial means in spaced relation thereto for carrying said pinion.

20. In a thermostatic control device, the combination comprising a housing having an inlet and an outlet, control valve means operably disposed in said housing adjacent the inlet for controlling a flow of fluid therefrom, dial means disposed on an external wall of said housing and operable for moving said control valve between controlling positions, a regulating valve operably disposed in said housing for regulating the flow of fluid to the outlet, a first regulating valve member disposed in axial alignment with said control valve means and said dial means, said first member being operatively connected to said control valve means for simultaneous movement therewith when said dial means is operated, a second member cooperating with said first member to form said regulating valve, thermally responsive means operative for imparting regulatory movement to one of said regulating valve members in response to temperature variations, a ring gear operatively connected to one of said members, a pinion engaging said ring gear, and means extending through said external wall of said housing and in spaced parallel relation to said dial means for carrying said pinion.

21. A thermostatic control device comprising a housing having an inlet and an outlet separated by a valve chamber, a tapered valve seat in said housing adjacent the inlet, a hollow valve member having an inner end extending into the chamber, a tapered intermediate part coacting with said tapered valve seat and formed with a port adapted to register with the inlet, and an outer end extending exteriorly of said housing through one side thereof, means mounted on the outer end of said hollow valve member for rotating the same to move the port into and out of registry with the inlet, an annular flanged bushing rotatably mounted in the chamber and having gear teeth on its external flanged periphery and screw threads on its internal surface, a generally cup-shaped valve seat having oppositely disposed slots in its bottom wall and screw threads on its external surface engaging the screw threads on said bushing, a reciprocating valve member cooperating with said valve seat to maintain a selected temperature in a space to be heated, thermally responsive means operatively connected to said reciprocating valve member to reciprocate the same relative to said valve seat in response to changes from the selected temperature, resilient means mounted in compression between said reciprocating valve member and said valve seat, a drive member having a front end locked into the slots on the bottom wall of said valve seat and a rear end slidably mounted on the inner end of said hollow valve member whereby rotation of the hollow valve member causes rotation of said valve seat to move the same axially relative to said reciprocating valve member for setting the selected temperature, a pinion extending into said chamber and engaging the gear teeth on said bushing, and means carrying said pinion and extending through the housing on the same side thereof as the outer end of the hollow valve member.

22. In a thermostatic control device, the combination comprising a housing having an inlet and an outlet, a valve chamber in said housing disposed between the inlet and the outlet, a valve assembly including a first member valve mounted for axial movement in said chamber and a second member within said chamber, said members being movable axially relative to each other for regulating flow of fluid from the inlet to the outlet, thermally responsive means operative to impart regulatory movement to one of the members relative to the other in response to temperature variations, manually rotatable actuating means for moving said first member axially relative to the second to select a desired temperature to be maintained by regulation of the flow of fluid by said first and second members, and means for calibrating the thermally responsive means relative to the manually rotatable actuating means, said calibrating means including a ring gear operably connected to and controlling axial movement of one of said members relative to the other, a pinion engaging said ring gear and means extending through the housing and accessible from the exterior thereof carrying said pinion.

References Cited in the file of this patent

UNITED STATES PATENTS

| | | |
|---|---|---|
| 1,058,171 | Froehlich | Apr. 8, 1913 |
| 1,926,533 | Grayson | Sept. 12, 1933 |
| 2,066,821 | Brumbaugh | Jan. 5, 1937 |
| 2,807,423 | Eskin | Sept. 24, 1957 |